June 17, 1969      J. V. HASSELL      3,449,855

OXYGENATED LIVE BAIT CONTAINER

Filed May 8, 1967      Sheet 1 of 3

INVENTOR
JACK V. HASSELL
BY Lothrop & West
ATTORNEYS

June 17, 1969      J. V. HASSELL      3,449,855
OXYGENATED LIVE BAIT CONTAINER
Filed May 8, 1967      Sheet 2 of 3
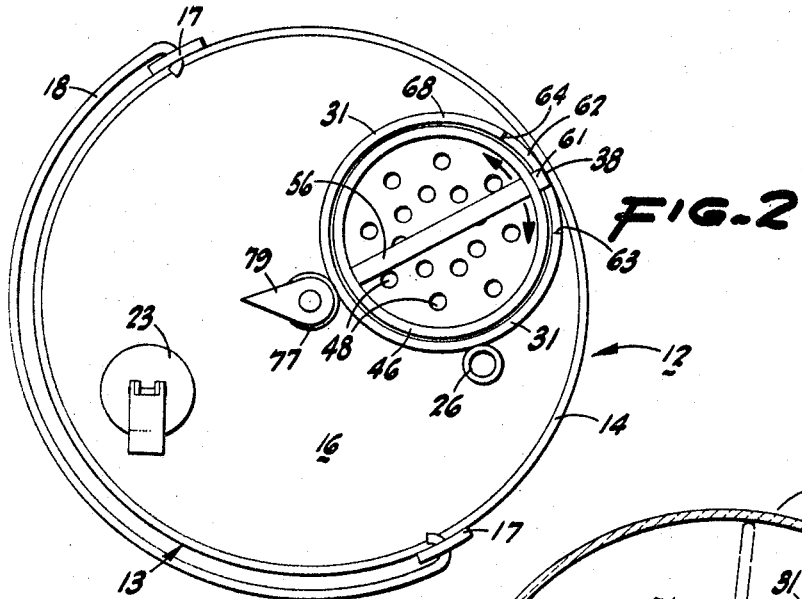
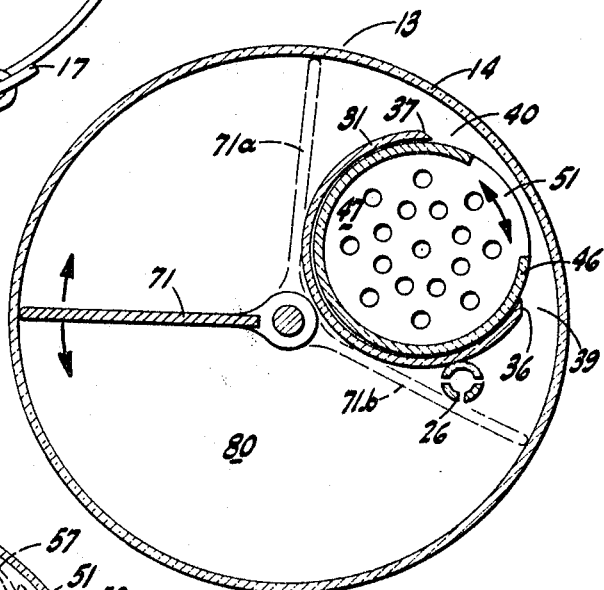
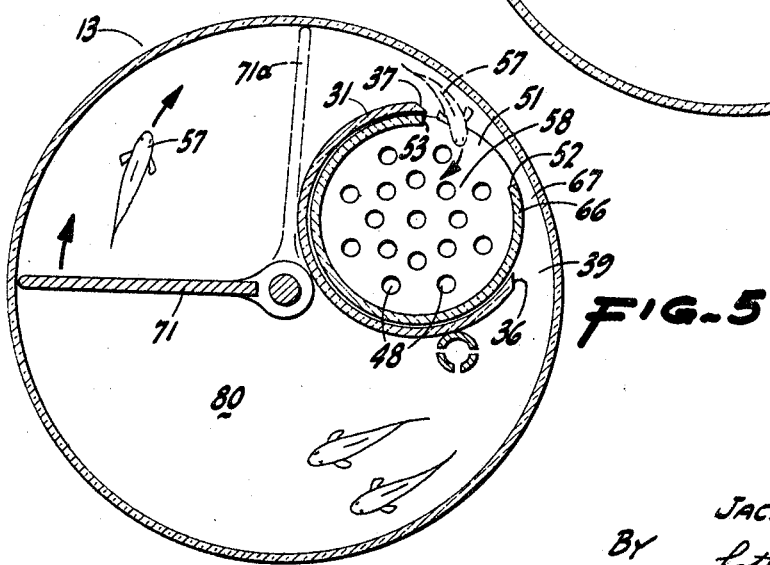
INVENTOR
JACK V. HASSELL
By Lothrop & West
ATTORNEYS

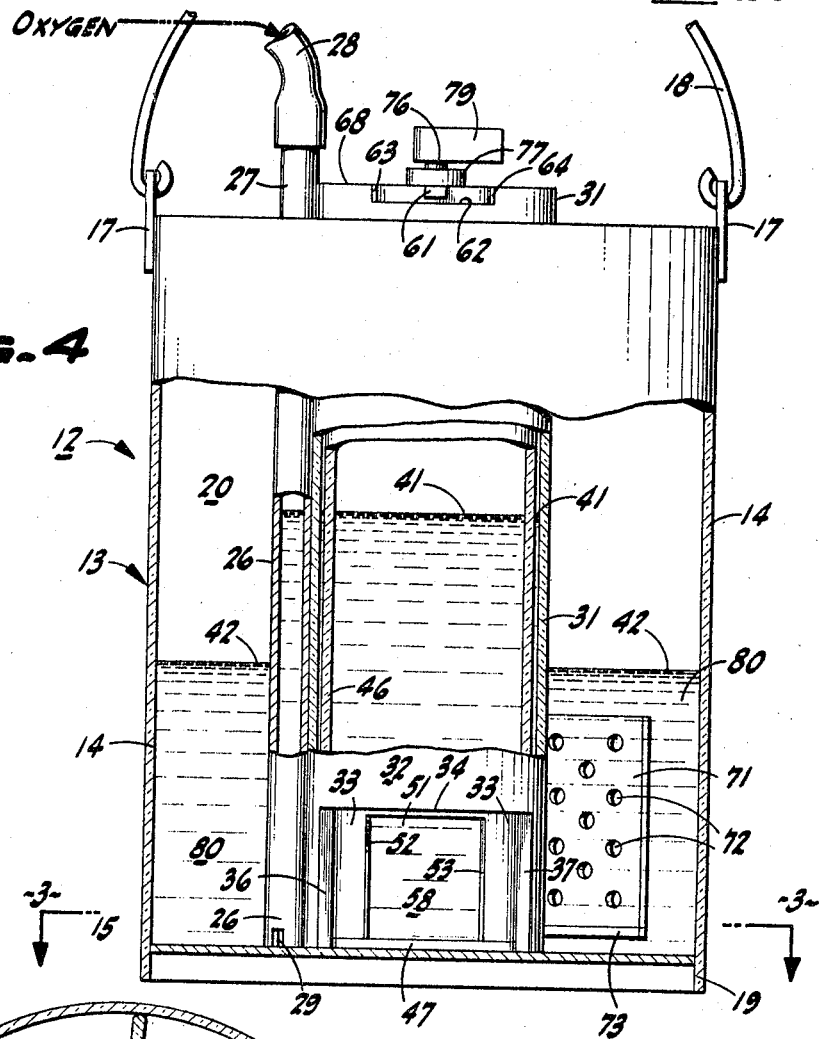
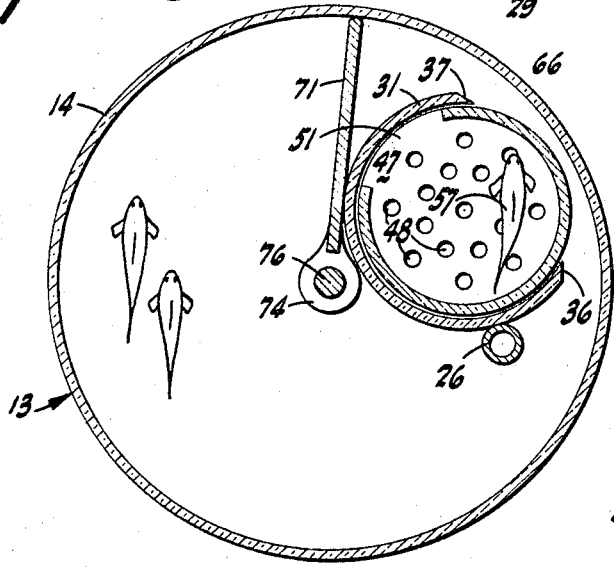

United States Patent Office 3,449,855
Patented June 17, 1969

3,449,855
OXYGENATED LIVE BAIT CONTAINER
Jack V. Hassel, 902 Del Paso Blvd., Sacramento, Calif., assignor of one-third each to Orin R. Munger, and Clifford E. Seavey
Filed May 8, 1967, Ser. No. 636,745
Int. Cl. A01k 97/04
U.S. Cl. 43—56                    10 Claims

ABSTRACT OF THE DISCLOSURE

The disclosure comprises a substantially sealed water container including a standpipe opening at its lower end to the interior of the chamber and at its upper end to the atmosphere, and means for introducing oxygen under pressure into the interior container chamber. The water rises in the standpipe to balance the internal oxygen pressure, thus providing a water seal. A sleeve is rotatably disposed within the standpipe and includes a gate movable into and out of registry with an opening in the standpipe as the sleeve is rotated. A swingable paddle directs a preselected live bait through the gate, when in registry with the standpipe opening, the bait passing into the interior of the sleeve, the sleeve being thereupon rotated to close the opening. The live bait thus entrapped within the sleeve is subsequently removed by axially withdrawing the sleeve from the standpipe and extracting the fish through the sleeve gate.

---

The invention relates to improvements in oxygenated live bait buckets.

The patent literature is replete with sealed live bait containers of various kinds wherein air under some pressure is introduced so as to increase the extent of oxygen forced into solution in the water.

The prior art devices, however, are frequently complicated and expensive, and are ineffective to maintain the live bait for extended periods in a vigorous condition, it having been found that the oxygen content of the air is insufficient.

It is therefore an object of the invention to provide a live bait container which is relatively economical and easy to operate, yet which keeps the bait at a high level of activity for as long as two to three weeks, or even more.

It is another object of the invention to provide a live bait container which enables the user to select one or more fish in the container and to direct such fish into a compartment from which the fish can readily be withdrawn as desired.

It is a further object of the invention to provide a live bait container which is light, strong, durable, compact, and easy to carry.

It is an additional object of the invention to provide a generally improved oxygenated live bait container.

Other objects, together with the foregoing, are attained in the embodiment described in the following description and shown in the accompanying drawings in which:

FIGURE 2 is a top plan view;

FIGURE 3 is a horizontal sectional view, the plane of the section being indicated by the line 3—3 in FIGURE 4;

FIGURE 4 is a rear elevational view, some portions being broken away and other portions being shown in section;

FIGURE 5 is a horizontal sectional view showing the movement of the paddle in directing a live bait through an open gate into the sleeve compartment; and, FIGURE 6 is a view comparable to FIGURE 5 but illustrating the gate in closed position preparatory to withdrawing the sleeve upwardly so as to obtain the entrapped live bait.

Figure 1:
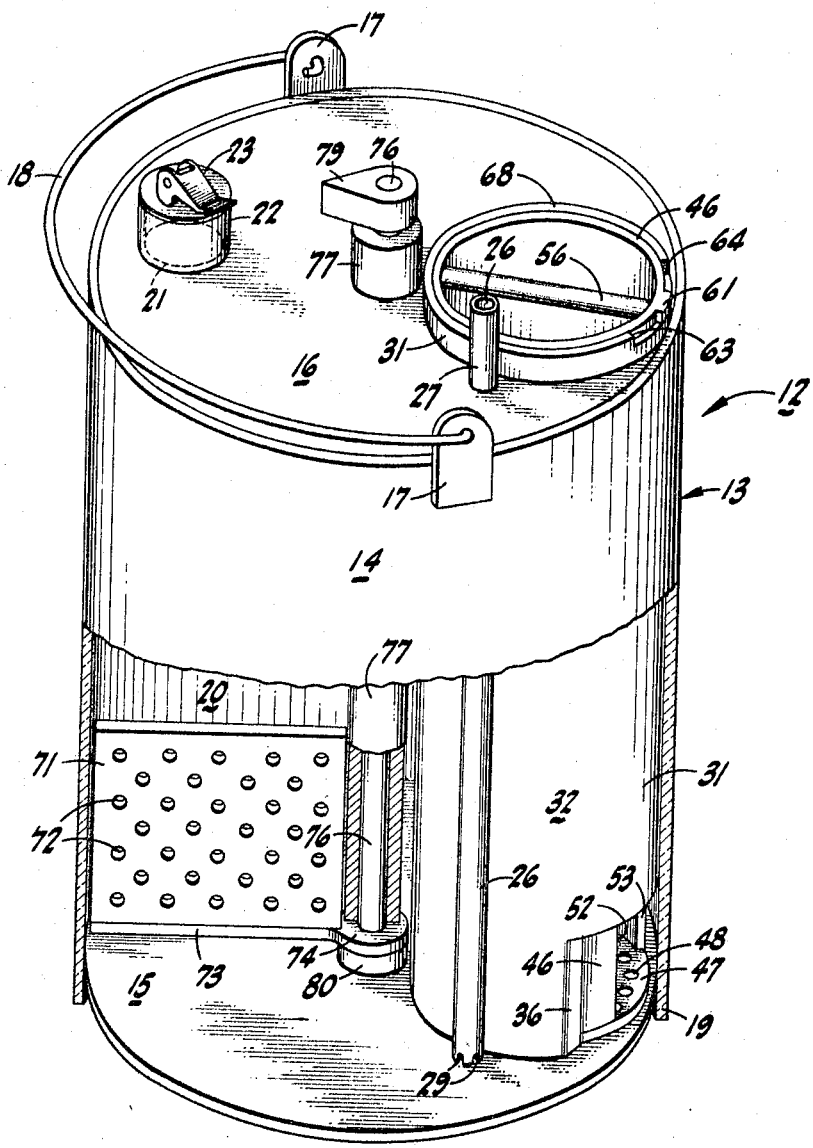
FIGURE 1 is a front perspective view, with portions broken away to reveal interior details.

While the live bait container of the invention is susceptible of numerous physical embodiments, depending upon the environment and requirements of use, substantial numbers of the herein shown and described embodiment have been made, tested and used, and all have performed in an eminently satisfactory manner.

The oxygenated live bait bucket of the invention, generally designated by the reference numeral 12, comprises a substantially sealed container 13, preferably right circular cylindrical in configuration, and including vertical side walls 14. The container is closed at its lower end by a bottom plate 15 and at its upper end by a top lid 16.

If desired, the top lid 16 can either be permanently sealed, around its periphery, to the encompassing side walls as shown herein; or the lid 16 can be made removable. In the latter event, an annular gasketed shoulder, or step, not shown, is formed in the upper end of the side walls to receive the lid, and conventional hold-down members, or clamps are utilized to effect a tight seal.

A pair of opposed, upstanding ears 17 on the side walls carries a bail 18, and handling of the bucket is made easier owing to the finger grip flange 19 around the lower end of the container.

Venting of the interior chamber 20 is afforded by a vent opening 21 in the lid 16. The opening is encircled by an upstanding collar 22 mounted on the lid top 16. Receivable within the collar 22 is a removable vent plug 23 similar to the variety used in thermal or vacuum bottles.

Oxygen is introduced into the vessel by a vertical conduit 26 extending through the lid in sealed relation. The upper, projecting portion 27, or spout, of the conduit 26 is removably connectable to a rubber hose 28 (see FIGURE 4) leading from a supply of oxygen through a standard throttling valve (not shown). The gauge pressure of the oxygen used herein would seldom exceed six ounces per square inch.

The conduit 26 extends downwardly to a location adjacent the bottom plate 15 of the container. If desired, a plurality of lateral gas outlet ports 29 can be formed in the bottom end of the tube 26.

Another major feature of the invention is the water seal afforded by a standpipe 31 extending upwardly from a location adjacent the bottom plate 15 and passing through an opening in the top lid 16 in sealed relation thereto.

Preferably, the vertical standpipe 31 is right circular cylindrical in shape and includes vertical side walls 32. The top of the standpipe is open to the atmosphere and communication between the interior the standpipe and the interior chamber 20 of the container is afforded by an opening 33 in the side wall 32 of the standpipe (see FIGURE 4). The opening 33 extends vertically from the bottom of the standpipe upwardly to the horizontal margin 34, and laterally from left hand beveled edge 36 to the right hand beveled edge 37 (see FIGURE 4), the arc of the opening 33 being approximately 120°.

As appears most clearly in FIGURE 2, the standpipe 31 is tangent to the container inner wall at the location indicated by the reference numeral 38 and in the embodiment shown herein, the vertical element of the standpipe tangent to the container wall is secured to the wall, as by an adhesive. The spaces between the beveled edges 36 and 37 and the container side walls afford respective channels 39 and 40 for the passage of one live bait at a time (see FIGURES 3 and 5).

As will be realized, where the lid is to be of the removable type, the standpipe would not be affixed to the container side wall. Instead, the standpipe would be affixed only to the lid, so that when the lid is removed, the standpipe is carried with the lid.

The standpipe 31, being open at its upper end is exposed to the atmosphere. Thus, with oxygen under some pressure within the chamber 20, water within the standpipe rises to the level indicated by the reference numeral 41 (see FIGURE 4). The difference in elevation between the water level 41 within the standpipe and the water level 42 within the chamber 20 represents the static water pressure head which, of course, equals the interior or gauge pressure exerted by the oxygen within the chamber 20 of the water surface 42.

The standpipe, in other words, affords a water seal which, in turn, provides access to the interior chamber without having to interrupt a pressure seal each time a minnow is to be withdrawn.

In order to effect withdrawal of a live bait, I provide a sleeve 46, circular cylindrical in shape and loosely disposed within the standpipe so as to permit relative rotational as well as axial movement between the standpipe 31 and the sleeve 46.

The upper end of the sleeve is open to the atmosphere and the bottom of the sleeve is covered by a disc 47 which is perforated by holes 48 to facilitate movement as the sleeve is moved axially upwardly or downwardly relative to the standpipe.

Access to the bottom interior of the sleeve is afforded by an arcuate cut out portion, or gate 51, covering approximately 60° in extent, that is to say, about one-half the arc of the opening 33 in the standpipe. The sleeve gate 51 is laterally defined by a left hand margin 52 and a right hand margin 53 (see FIGURE 4); and, vertically, the gate 51 extends upwardly from the perforate bottom disc 47 to the upper horizontal margin 34 of the standpipe opening 33.

Rotation of the sleeve 46 and lifting thereof is conveniently provided by a handle 56 diametrically spanning the upper end of the sleeve.

The sleeve gate 51 is shown centered with respect to the standpipe opening 33 in FIGURES 1–4.

However, in the operation of the device, as will subsequently be explained in detail, the sleeve gate 51 becomes operative to receive the live bait 57 when the sleeve is rotated to the location shown in FIGURE 5, for example, wherein the gate margin 53 is substantially coincident with the beveled margin 37 of the standpipe opening. In this position, the live bait 57 can readily pass through the channel 40, thence through the registering portion of the sleeve gate and the standpipe opening and thus enter the interior compartment 58 defined by the sleeve walls.

In the alternative, the sleeve is rotatable in the opposite direction so that the gate margin 52 coincides with the beveled margin 36 of the standpipe thus enabling a live bait to pass through the channel 39 and enter the compartment from the opposite side, if desired.

A convenient indexing structure is provided to indicate to the user these two limits of gate movement. The indexing structure includes a tab 61 projecting radially outwardly from the upper end of the sleeve, as is shown most clearly in FIGURES 1, 2 and 4. The tab 61 moves in an arcuate recess 62 formed in the upper end of the standpipe, the recess 62 being defined at its opposite ends by vertical shoulders 63 and 64. Abutment between the tab projection 61 and the shoulder 63, or the shoulder 64, limits the extent of rotation of the sleeve, and the arc of the recess 62 is such that the respective abutments properly locate or index the sleeve gate on one side or the other of the standpipe opening in registry with the opening.

For example, when the tab 61 is in abutment with the recess shoulder 64, the gate margin 63 coincides with the beveled edge 37, and the sleeve gate 51 is in registry with the twelve to two o'clock segment of the standpipe opening, as it appears in FIGURE 5, thus affording the live bait 57 free entryway. However, in this same position of the parts, the sleeve wall portion 66 adjacent the gate margin 52 effectively pinches off egress. The passageway width 67 (see FIGURE 5), in other words, is too narrow for any live bait 57 entering the standpipe to escape therefrom.

The indexing tab 61, it will be noted, is in alignment with the sleeve handle 56, and this arrangement affords a further guide to the user in properly positioning the sleeve, even in the dark.

After a fish has entered, the sleeve is lifted slightly and rotated so that the tab 61 is removed from the arcuate recess 62. The tab 61 in this case can ride on the arcuate upper end 68 of the standpipe, the sleeve then being rotatable into the position shown in FIGURE 6, for example, wherein the sleeve gate 51 is sealed off, or covered, by the adjacent, encompassing side wall portion 31 of the standpipe. In this situation, the live bait is confined within the sleeve.

At this juncture the user can, as desired, take hold of the handle 56 and lift the sleeve far enough out of the standpipe so that the user's fingers can reach through the sleeve gate and graps the minnor supported on the perforated disc 47, the water having drained from the sleeve as the sleeve is lifted.

As another important feature of the invention, means are provided for guiding the movement of the live bait stored within the container so that one, two, three fish, or even more, as desired, can be directed from the main pool 80 into the sleeve compartment 58 and trapped therein by rotating the sleeve to the FIGURE 6 position, as previously explained.

The fish guiding means includes a vertical, radial paddle 71 provided with a plurality of apertures 72 to reduce water resistance as the paddle is swung. The paddle 71 is supported on a radial arm 73 projecting from a hub 74 affixed to a vertical spindle 76 journaled in a tube 77 extending upwardly through the top lid 16 in sealed relation. The upper end of the spindle 76 carries a pointer 79 oriented to conform to the orientation of the paddle, and the lower end of the spindle is journaled in an annular ring 80 mounted on the bottom plate 15.

It is believed appropriate at this juncture to mention that in its preferred embodiment, the components used therein are fabricated from substantially transparent plastic material, with the exception of the vent plug 23.

The plastic material is not only water and gas tight, and free from corrosion, but it also enables the user to inspect the interior so as to ascertain the number, condition and arrangement of the live bait stored therein.

The operation of the device is as follows:

With the container empty, the vent plug 23 is removed from the collar 22, and, preferably, the sleeve 46 is lifted out of the standpipe 31. If the sleeve 46 is left in the standpipe, the sleeve should be rotatably oriented so that the sleeve gate is in registry with the standpipe opening to provide free communication between the standpipe and the chamber 20.

Water is thereupon poured into the open upper end of the standpipe (or sleeve if left in), displacing all air within the container.

Then, after replacing the vent plug, the oxygen hose 28 is placed on the oxygen intake spout 27 and oxygen is introduced until the water level 42 within the chamber 20 is approximately at the same height as the top of the paddle 71. During this operation, the excess, displaced water rises and overflows out of the standpipe and spills to waste.

The oxygen hose is removed, and if it is thought desirable to lower the standpipe water level 41 somewhat, a very slight amount of oxygen is vented by a momentary loosening of the vent plug. This step puts the respective water levels 41 and 42 at the approximate elevations shown in FIGURE 4.

At this juncture, the live bait is introduced into the open upper end of the standpipe. The sleeve should preferably be out of the standpipe during this step. It might be noted that in a standard size bucket, up to six dozen live bait can be initially stored in the present container.

As the fish are poured into the standpipe, substantially all will immediately swim outwardly through the standpipe gate into the main chamber. At times, one or two fish will remain within the standpipe. In order to prevent harm to these, the sleeve is inserted carefully into the standpipe and slowly lowered to drive these few fish outwardly through the standpipe opening and into the main chamber.

At this juncture, the sleeve can be bottomed in the standpipe and the live bait are all located in the main chamber pool 80.

Preferably, during the introduction of the minnows, the paddle is oriented in one or the other of the extreme positions 71a or 71b shown in FIGURE 3, thus directing the majority of the fish in the opposite direction as they emerge from the standpipe opening. The sleeve, after being lowered into the standpipe, is rotated so that the gate 51 is open on the side opposite the paddle location.

To summarize, all of the fish at this juncture are located in the main pool 80 and the paddle is in one or the other of the extreme positions, with the gate sealed adjacent the paddle, but opened on the side opposite the paddle.

The paddle is thereupon slowly rotated away from its extreme position driving the fish toward the opposite channel and through the opened gate in communication with the opposite channel.

After one, two, or three minnows, for example, are forced through the gate into the interior sleeve compartment, the paddle motion is stopped and the sleeve is rotated into sealed position, as in FIGURE 6, thus entrapping the fish in the manner previously described.

Thereafter, as one or more of the live bait is desired, the sleeve is lifted until the gate is exposed above the standpipe. The user then reaches through the gate with his fingers and picks out the minnow, or minnows, desired.

The sleeve is thereafter replaced in the standpipe and rotated to sealed position. Thereafter, the operation is continued as desired.

In order to empty the bucket, the sleeve and the vent plug are removed. The water can then be poured out. To clean, a small amount of detergent and water can be introduced and swirled around the interior, followed by rinsing with clear water.

As previously stated, the use of pure oxygen provides a remarkably salutary effect upon the longevity and vigorous condition of the live bait. Should any live bait remain at the end of the day's fishing, they can be stored in the container for many days without any further attention other than an occasional recharging with oxygen to replace that which has passed into solution.

It can therefore be seen that I have provided an oxygenated live bait bucket which affords a high degree of convenience as well as an environment in which the fish are maintained for extended periods in a lively, vigorous condition.

What is claimed is:
1. A live bait bucket comprising:
(a) a container including side walls, a top lid and a bottom plate defining an interior chamber;
(b) a vertical standpipe in said chamber extending upwardly through said top lid in sealed relation thereto, said standpipe including a side wall opening adjacent said bottom plate;
(c) a hollow sleeve member substantially vertically coextensive with respect to said standpipe, said sleeve member including a perforate bottom closure and a side wall gate adjacent said bottom closure, said sleeve member being loosely disposed within said standpipe for axial removal therefrom and for rotation relative thereto between a first open position wherein said gate is in substantial registry with respect to said opening and a second closed position wherein said gate is out of registry relative to said opening; and
(d) means for introducing oxygen under pressure into said chamber.

2. A live bait bucket as in claim 1 wherein the upper end of said sleeve is open to the atmosphere, thereby allowing water within said chamber to rise in said sleeve and in said standpipe to provide a static pressure head equal to the pressure of the oxygen within said chamber and forming a water seal between said chamber and the atmosphere.

3. A device as in claim 2 including a vertical tube passing through said top lid in sealed relation thereto, said tube terminating adjacent said botom plate, a spindle journaled in said tube, and a paddle mounted adjacent the lower end of said spindle, said paddle being capable of sweeping across a portion of said bottom plate as said spindle is rotated and being thereby effective to direct live bait ahead of said paddle in a desired direction.

4. A device as in claim 3 wherein said oxygen introducing means includes a conduit passing downwardly through said top lid in sealed relation thereto and terminating adjacent said bottom plate.

5. A device as in claim 4 wherein said container is substantially circular cylindrical in shape, and said spindle and said tube are disposed coaxially with respect to the vertical axis of said container.

6. A device as in claim 5 wherein said paddle is mounted radially on said spindle and extends outwardly from said spindle to a location adjacent said side walls of said container.

7. A device as in claim 6 including means on said sleeve for indexing said sleeve gate relative to said standpipe opening.

8. A device as in claim 7 wherein said indexing means includes an arcuate segment in the upper end of said standpipe bounded at each end by an interruption, and a projecting member on said sleeve capable of engaging said interruptions, said interruptions and said projecting member being located in dependence upon the respective placements of said standpipe opening and said sleeve gate.

9. A device as in claim 5 wherein said standpipe is located in said chamber with a vertical element of said standpipe substantially tangent to the interior surface of said container side wall, and wherein said standpipe opening is located centrally on said tangent element.

10. A device as in claim 9 wherein the outer diameter of said standpipe extends between said tangent and said spindle tube.

References Cited
UNITED STATES PATENTS

| | | | |
|---|---|---|---|
| 299,690 | 6/1884 | Sherwood | 43—56 |
| 2,651,137 | 9/1953 | Sweet | 43—56 |
| 2,740,546 | 4/1956 | Kowalski | 43—56 |
| 3,196,576 | 7/1965 | Thomas | 43—56 X |

HUGH R. CHAMBLEE, *Primary Examiner.*

UNITED STATES PATENT OFFICE
CERTIFICATE OF CORRECTION

Patent No. 3,449,855　　　　　　　　　　　　　　　　　June 17, 1969

Jack V. Hassell

It is certified that error appears in the above identified patent and that said Letters Patent are hereby corrected as shown below:

In the heading to the printed specification, lines 3 to 5, "902 Del Paso Blvd., Sacramento, Calif., assignor of one-third each to Orin R. Munger, and Clifford E. Seavey" should read -- Sacramento, Calif., assignor of fifty percent to Orin R. Munger, Dickinson, Tex., and fifty percent to Clifford E. Seavey, Sacramento, Calif. --.

Signed and sealed this 3rd day of March 1970.

(SEAL)
Attest:

Edward M. Fletcher, Jr.　　　　　　　　　　　　WILLIAM E. SCHUYLER, JR.
Attesting Officer　　　　　　　　　　　　　　　　Commissioner of Patents